United States Patent
Celi, Jr. et al.

(10) Patent No.: US 8,135,670 B2
(45) Date of Patent: Mar. 13, 2012

(54) EMBEDDED CHANGE LOGGING FOR DATA SYNCHRONIZATION

(75) Inventors: Joseph Celi, Jr., Boca Raton, FL (US); Ashok C. Mammen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 12/177,628

(22) Filed: Jul. 22, 2008

(65) Prior Publication Data

US 2010/0023533 A1 Jan. 28, 2010

(51) Int. Cl.
*G06F 7/00* (2006.01)
*G06F 17/00* (2006.01)

(52) U.S. Cl. ........ 707/611; 707/614; 707/770; 709/203; 709/245; 709/248

(58) Field of Classification Search ............. 707/611, 707/614, 770; 709/203, 245, 248; 370/392, 370/347
See application file for complete search history.

(56) References Cited

U.S. PATENT DOCUMENTS

| | | | |
|---|---|---|---|
| 5,857,201 A * | 1/1999 | Wright et al. | 707/E17.005 |
| 6,810,405 B1 * | 10/2004 | LaRue et al. | 707/613 |
| 6,999,800 B2 * | 2/2006 | Peng et al. | 455/574 |
| 7,437,484 B2 * | 10/2008 | Auriemma et al. | 709/248 |
| 7,756,825 B2 * | 7/2010 | Khosravy et al. | 707/611 |
| 2004/0117507 A1 * | 6/2004 | Torma | 709/248 |
| 2004/0205263 A1 * | 10/2004 | Sivaraman et al. | 709/248 |
| 2005/0125459 A1 * | 6/2005 | Sutinen et al. | 707/201 |
| 2006/0056370 A1 * | 3/2006 | Hancock et al. | 370/338 |
| 2006/0265434 A1 * | 11/2006 | Kathuria et al. | 707/204 |
| 2007/0014244 A1 * | 1/2007 | Srinivasan et al. | 370/252 |
| 2007/0208803 A1 * | 9/2007 | Levi et al. | 709/203 |

OTHER PUBLICATIONS

Peterson et al.—"Preserving and Using Context Information in Interprocess Communication"—ACM Transaction on Computer Systems (TOCS) vol. 7, issue 3 Aug. 1998 (pp. 217-246:1-30).*
Tummarello et al.—"RDFSync.: Efficient Remote Synchronization of RDF Models" The Semantic Web, 2007, SpringerLink computer science, vol. 4825/2007, (pp. 537-551:1-15).*

* cited by examiner

*Primary Examiner* — John E Breene
*Assistant Examiner* — Anh Ly
(74) *Attorney, Agent, or Firm* — Steven M. Greenberg, Esq.; Carey, Rodriguez, Greenberg & O'Keefe, LLP

(57) ABSTRACT

Embodiments of the present invention provide for embedded change logging for data synchronization. In an embodiment of the invention, an embedded change logging data processing system can include a change embedded database (EDB) disposed in a pervasive device. The EDB can store entries for notified changes in data for multiple different end-user applications in the pervasive device. The system also can include a change log service (CLS) disposed in the pervasive device and coupled to the EDB. The CLS can include program code enabled to register with multiple different end-user applications in the pervasive device to receive notifications of changes, and to write entries to the EDB responsive to the notifications. Finally, the system can include a synchronization client disposed in the pervasive device separately from the CLS. The synchronization client can include program code enabled to directly access the EDB to perform data synchronization with a remote host.

16 Claims, 2 Drawing Sheets

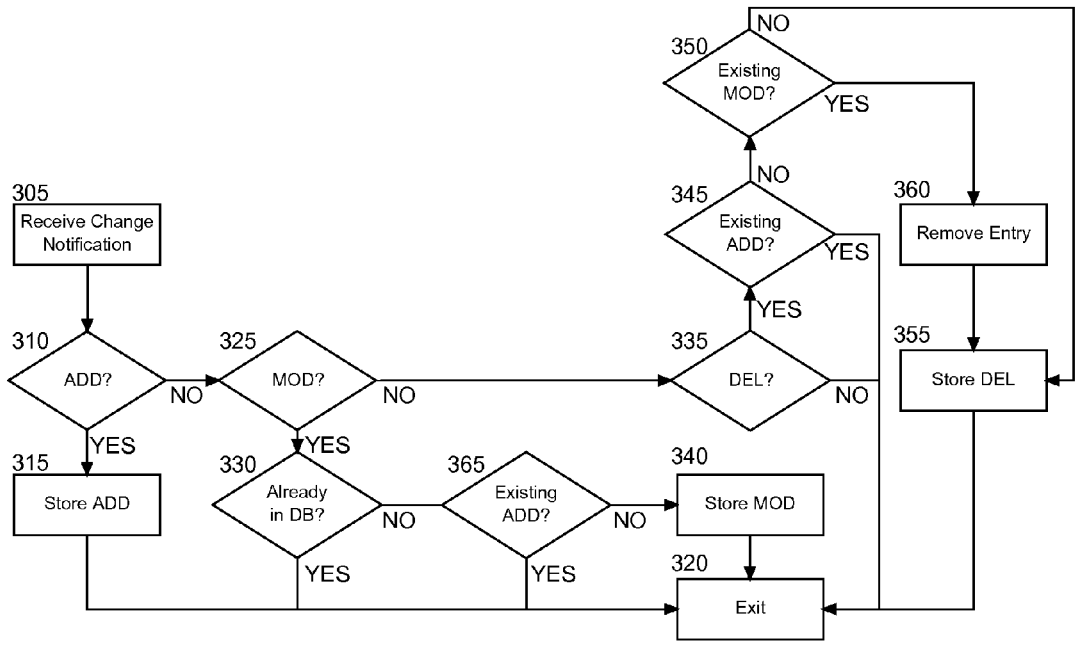
FIG. 3
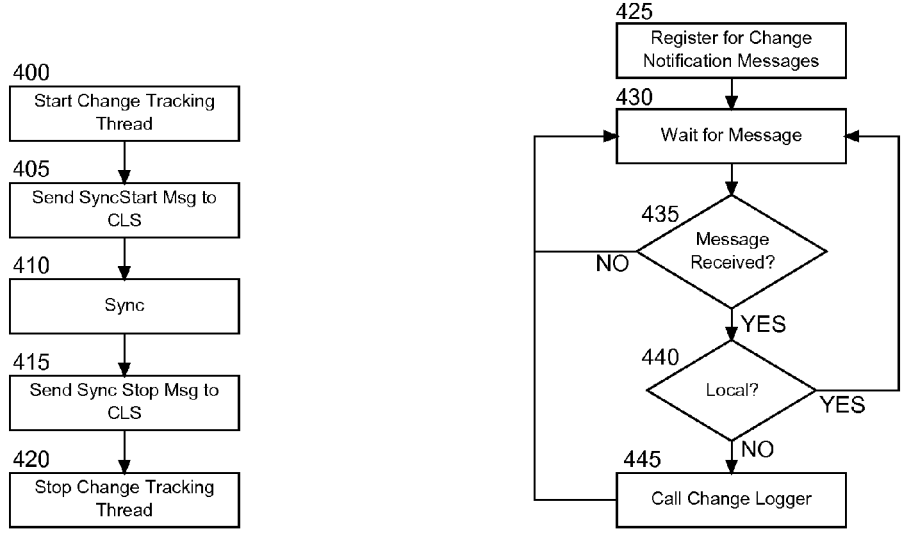
FIG. 4A  FIG. 4B

EMBEDDED CHANGE LOGGING FOR DATA SYNCHRONIZATION

BACKGROUND OF THE INVENTION

1. Field of the Invention

The present invention relates to pervasive device computing and more particularly to the field of data synchronization for pervasive devices.

2. Description of the Related Art

Personal computers no longer are the most common vehicle through which users connect to data communications networks like the Internet. Now that computing can be viewed as being truly everywhere, computer scientists and information technologists have begun to rethink those services that can be provided to meet the needs of mobile computing users. In consequence, the study of pervasive computing has resulted in substantial innovation in the field of network connectivity. "Pervasive computing" has been defined as referring to any non-constrained computing device not physically tethered to a data communications network. Thus, pervasive computing devices refer not only to computers wirelessly linked to networks, but also to handheld computing devices, wearable systems, embedded computing systems and the like.

Most pervasive devices, including notebook computers, handheld computers and even data enabled cellular telephones permit data synchronization with a different computing device, for example a desktop computer. Data synchronization refers to the harmonization of data between two data sources such that the data contained in each data source can be reconciled notwithstanding changes to the data applied in either or both of the data sources. Modern pervasive devices provide for a synchronization process through a direct cable link, a modem link, or a network link to a host computing device. Wireless pervasive devices further can accommodate synchronization over infrared or radio frequency links.

Excessive and unnecessary consumption of computing resources arises in the context of filtered synchronization. In filtered synchronization, updates can be filtered according to specified filtering criteria. As a result, only a subset of available updates will be pushed to the pervasive device. Filtered synchronization can occur at the manual behest of an end user, or dynamically as changes are detected in the pervasive device. In the latter circumstance, an event can be triggered whenever a change is detected resulting in a synchronization. Recognizing that events can occur in groupings within a short period of time, it is common to wait in response to an event for a period of time in order to provide for batched synchronization of several changes at once.

Once a batch of changes have been queued for synchronization, a background process can execute in which the filtered synchronization can be performed while foreground applications continue to function. Yet, it is to be recognized that data synchronization can be resource intensive and can degrade or outright impede the performance of the pervasive device. Further, to the extent that resources within the pervasive device fall below a critical level of availability—for instance, battery life, central processing unit (CPU) cycles, communications bandwidth or memory—a data synchronization can prevent foreground tasks in the pervasive device or indeed the pervasive device itself from functioning.

BRIEF SUMMARY OF THE INVENTION

Embodiments of the present invention provide a method, system and computer program product for embedded change logging for data synchronization. In an embodiment of the invention, an embedded change logging data processing system can be configured for data synchronization. The system can include an embedded database (EDB) disposed in a pervasive device. The EDB can store entries for notified changes in data for multiple different end-user applications in the pervasive device. The system also can include a change log service (CLS) disposed in the pervasive device and coupled to the EDB. The CLS can include program code enabled to register with multiple different end-user applications in the pervasive device to receive notifications of changes, and to write entries to the EDB responsive to the notifications. Finally, the system can include a synchronization client disposed in the pervasive device separately from the CLS. The synchronization client can include program code enabled to directly access the EDB to perform data synchronization with a remote host.

In one aspect of the embodiment, the program code of the CLS can be further enabled to optimize the entries in the EDB by accounting for an existing entry in the EDB relative to a change action specified in a proposed entry to the EDB. In another aspect of the embodiment, the program code of the CLS can be further enabled to direct power management settings in the pervasive device requisite for change logging performed by the CLS. In yet another aspect of the embodiment, the program code of the CLS can be further enabled to flush the EDB to persistent storage in the pervasive device to protect against power loss in the pervasive device. Finally, in even yet another aspect of the embodiment, the program code of the CLS can be further enabled to specify a slow sync in response to a reset condition detected in the pervasive device.

In another embodiment of the invention, an embedded change logging method can be provided. The method can include registering for change notifications amongst multiple different end-user applications in a pervasive device, receiving a change notification for a particular one of the end-user applications, writing an entry to a change log in the pervasive device for the change notification, and synchronizing the entry with a remote host. Optionally, the entry in the change log in the pervasive device can be removed only when determining the synchronizing to have been successfully completed.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 3 is a flow chart illustrating a change logging optimization process for change logging in the data processing system of FIG. 1;

FIG. 4A is a flow chart illustrating a process for synchronization client coordination with the CLS of FIG. 1; and, FIG. 4B is a flow chart illustrating a process for notification message processing in the synchronization client of FIG. 1.

DETAILED DESCRIPTION OF THE INVENTION

Embodiments of the present invention provide a method, system and computer program product for embedded change logging for data synchronization. In accordance with an embodiment of the present invention, a CLS can be activated within a pervasive device and the CLS can register for changes in different end-user applications in the pervasive device, such as a personal information manager (PIM) or e-mail client. Change notifications received by the CLS for the different end-user applications can be recorded in a EDB and the CLS can optimize the EDB to minimize changes to be synchronized with a server-side counterpart to the pervasive device. The CLS further can notify a separate synchronization service as changes are received such that the separate synchronization service can synchronize the changes in the EDB with the server-side counterpart.

Figure 1:
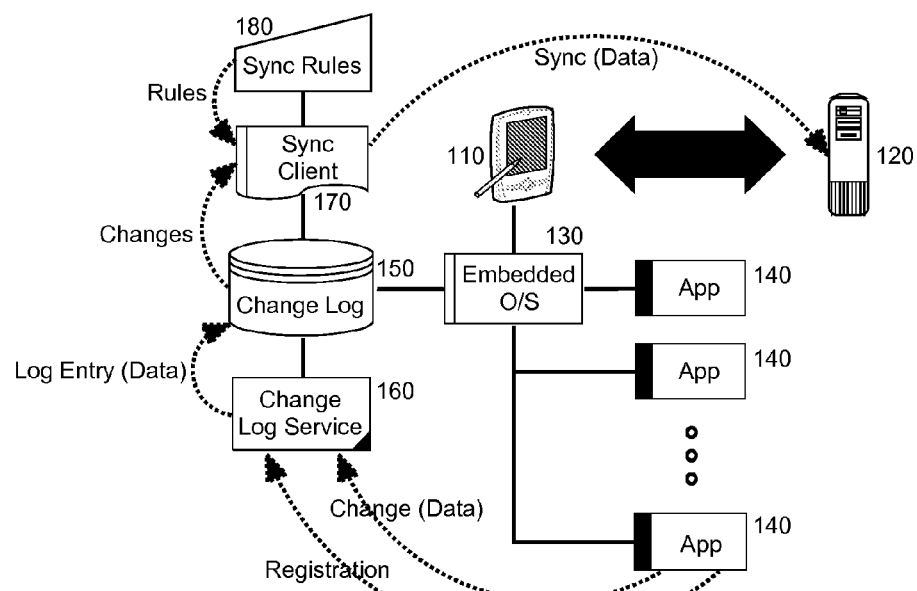
FIG. 1 is a schematic illustration of an embedded change logging data processing system configured for data synchronization.

In illustration, FIG. 1 schematically shows an embedded change logging data processing system configured for PIM and e-mail synchronization. As shown in FIG. 1, a pervasive device 110 can include an embedded operating system 130 supporting the operation of one or more end-user applications 140 having counterparts to the end-user applications 140 in host 120. The embedded operating system 130 also can support access to a EDB 150 logging changes in the different end-user applications 140 for synchronization with the host 120. A CLS 160 can execute in the embedded operating system 130, for example as an operating system service dynamic link library (DLL) to be loaded at start up time.

The CLS 160 can register for changes in selected ones of the end-user applications 140 in response to which change notifications are provided to the CLS. Change notifications can include, by way of example, additions, deletions or modifications to data for the end-user applications 140. As change notifications are received, the CLS 160 can store the proposed changes in the EDB 150. Further, the entries in the EDB 150 can be minimized through the use of synchronization rules 180. In this regard, the synchronization rules 180 provide for the optimization of the EDB 150 by eliminating redundant or moot entries in the EDB 150.

Even yet further, the entries in the EDB 150 can be of minimal size indicating in a single data structure a timestamp, synchronization action, and the requisite data both old and new as the case may be. Also, periodically the content of the EDB 150 can be flushed to persistent storage to provide surety in the case of power failure in the pervasive device 110. Likewise, the CLS 160 can notify the embedded operating system 130 of the power requirements requisite to handling a change notification in order to optimally manage power in the pervasive device 110. Finally, in connection with the detection of a reset or a power failure in the pervasive device 110, the CLS 160 can request a slow sync between the pervasive device 110 and the host 120. Specifically, as the skilled artisan will recognize, a slow sync is a form of the two-way synchronization in which all entries in the EDB 150 and its counterpart in the host 120 can be compared on a field-by-field basis to perform a "full" synchronization.

A separate synchronization client 170 can be provided in the pervasive device 10 and can be configured to access the EDB 150 directly as the request of the CLS 160. In this regard, the synchronization client 170 can include program code enabled to identify changes in the EDB 150 and to synchronize the identified changes with the host 120. The program code also can be enabled to remove entries from the EDB 150 once those entries have been successfully synchronized with the host 120, but not beforehand in order to recover from connectivity failures between pervasive device 110 and host 120 during synchronization.

Figure 2:
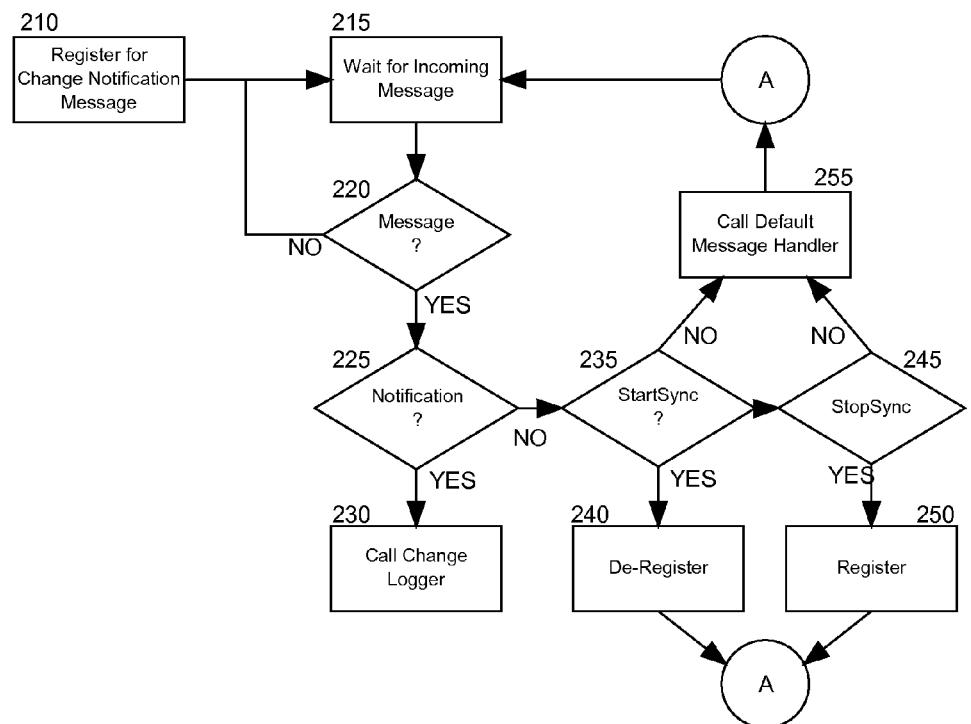
FIG. 2 is a flow chart illustrating an embedded change logging process for data synchronization in the data processing system of FIG. 1.

The operation of the CLS 150 will be understood by reference to FIG. 2 in which a flow chart is shown illustrating an embedded change logging process. Beginning in block 210, the CLS can register for a change notification message from an end-user application executing in the pervasive device and in block 215, the CLS can await an incoming message. In decision block 220, it can be determined whether a message has been received. If so, in decision block 225 it can be determined whether the message is a change notification from the end-user application. If so, the change logger can be called in block 230 to manage entries in the EDB responsive to the change notification. Otherwise, the process can continue to decision block 235.

In decision block 235, it can be determined whether the message is a start synchronization message indicating the initiation of data synchronization by the synchronization client. If so, in block 240 the CLS can de-register from receiving notification messages from the end-user application to accommodate the data synchronization. Otherwise, in decision block 245 it can be determined whether the message is a stop synchronization message indicating the completion of data synchronization by the synchronization client. If so, in block 250 the CLS can re-register in order to again receive notification messages from the end-user application. If, however, the message is neither a start synchronization or stop synchronization message, in block 255 the default message handler can be called in block 255 and the process can return to block 215.

Referring now to FIG. 3, when the change logger has been called to respond to a notification process, a change logging process can commence in the CLS. Beginning in block 305, a change notification message can be received for a particular object and in decision block 310, it can be determined whether the change log action associated with the message is an ADD. If so, in block 315 an entry can be added to the EDB for the object. For the purpose of minimalism, the entry can include a single data structure as set forth herein:

```
typedef struct
{
    FILETIME timestamp;
    CHGLOG_ACTION action'
    ULONG flags;
    OID oid;
    OID parentOid;
    OID oldParentOid;
} LogEntry;
typedef enum
{
    CLACT_NON = -1,
    CLACT_ADD,
    CLACT_DELETE,
    CLACT_MODIFY,
    CLACT_MOVE,
```

-continued

```
        CLACT_DOWNLOAD,
        CLACT_IGNORE_OID,
        CLOACT_COUNT
    } CHGLOG_ACTION;
```

In any event, once the entry has been added to the EDB, the process can exit in block 320.

In decision block 310, if the change log action associated with the message is not an ADD, in decision block 325 it can be determined whether the change log action associated with the message is a MOD. If so, in decision block 330 it can be determined whether the entry already exists in the EDB for the object. If not, in decision block 365 it further can be determined whether an existing ADD exists for the object. If not, in block 340 the MOD entry can be stored in the EDB for the object. Otherwise, the process can exit in block 320. In decision block 325, if the change log action associated with the message is not a MOD, in decision block 335 it can be determined whether the change log action associated with the message is a DEL. If so, in block 345 it can be determined whether an existing ADD can be found for the object. If so, the process can end in block 320. Otherwise, in block 350 it further can be determined whether an existing MOD for the object can be found in the EDB. If so, the change log action associated with the existing MOD entry can be removed in block 360. In either case, in block 355 the DEL can be stored in connection with the object and the process can exit in block 320.

Notably, the synchronization client can coordinate its operation with the CLS in order to avoid conflicts in entries in the EDB during synchronization. In this regard, FIG. 4A is a flow chart illustrating a process for synchronization client coordination with the CLS of FIG. 1. Beginning in block 400, a change tracking thread can be initiated to track changes to data requiring synchronization. In block 405, upon detecting a change, a synchronization message can be sent to the CLS. Thereafter, synchronization can be performed in block 410. Once completed, in block 415 a synchronization stop message can be sent to the CLS. Finally, in block 420, the change tracking thread can be stopped.

The synchronization client also can optimize its behavior by differentiating between local and remote changes during change tracking. In illustration, FIG. 4B is a flow chart depicting a process for notification message processing in the synchronization client of FIG. 1. Beginning in block 425, the synchronization client can register to receive change notification messages from one or more end user applications. Thereafter, in block 430, the synchronization client can await the receipt of a notification message. In decision block 435, if a message is received, in decision block 440 it can be determined whether or not the change is local in that it originates from the synchronization client. If so, the change can be ignored. Otherwise, in block 445 the change logger can be called to process the message.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. An embedded change logging data processing system configured for data synchronization, the system comprising:
    an embedded database (EDB) disposed in a pervasive device, the EDB storing entries for notified changes in data for multiple different end-user applications in the pervasive device;
    a change log service (CLS) disposed in the pervasive device and coupled to the EDB, the CLS comprising program code enabled to register with multiple different end-user applications in the pervasive device to receive notifications of changes, and to write entries to the EDB responsive to the notifications; and,
    a synchronization client disposed in the pervasive device separately from the CLS, the synchronization client comprising program code enabled to directly access the EDB to perform data synchronization with a remote host and to remove the entry in the change log in the pervasive device only when determining the synchronizing to have been successfully completed.

2. The system of claim 1, wherein the program code of the CLS is further enabled to optimize the entries in the EDB by accounting for an existing entry in the EDB relative to a change action specified in a proposed entry to the EDB.

3. The system of claim 1, wherein the program code of the CLS is further enabled to direct power management settings in the pervasive device requisite for change logging performed by the CLS.

4. The system of claim 1, wherein the program code of the CLS is further enabled to flush the EDB to persistent storage in the pervasive device to protect against power loss in the pervasive device.

5. The system of claim 1, wherein the program code of the CLS if further enabled to specify a slow sync in response to a reset condition detected in the pervasive device.

6. An embedded change logging method comprising:
registering for change notifications amongst multiple different end-user applications in a pervasive device;
receiving a change notification for a particular one of the end-user applications;
writing an entry to a change log in the pervasive device for the change notification;
synchronizing the entry with a remote host; and
removing the entry in the change log in the pervasive device only when determining the synchronizing to have been successfully completed.

7. The method of claim 6, further comprising optimizing the change log by accounting for an existing entry in the change log relative to a change action specified in a proposed entry to the change log.

8. The method of claim 6, further comprising directing power management for the pervasive device requisite for the writing of the change log.

9. The method of claim 6, further comprising flushing the change log to persistent storage in the pervasive device to protect against power loss in the pervasive device.

10. The method of claim 6, further comprising specifying a slow sync in response to a reset condition detected in the pervasive device.

11. A computer program product comprising a computer usable medium embodying computer usable program code for embedded change logging, the computer program product comprising:
computer usable program code for registering for change notifications amongst multiple different end-user applications in a pervasive device;
computer usable program code for receiving a change notification for a particular one of the end-user applications;
computer usable program code for writing an entry to a change log in the pervasive device for the change notification; and,
computer usable program code for synchronizing the entry with a remote host; and
computer usable program code for removing the entry in the change log in the pervasive device only when determining the synchronizing to have been successfully completed.

12. The computer program product of claim 11, further comprising computer usable program code for removing the entry in the change log in the pervasive device only when determining the synchronizing to have been successfully completed.

13. The computer program product of claim 11, further comprising computer usable program code for optimizing the change log by accounting for an existing entry in the change log relative to a change action specified in a proposed entry to the change log.

14. The computer program product of claim 11, further comprising computer usable program code for directing power management for the pervasive device requisite for the writing of the change log.

15. The computer program product of claim 11, further comprising computer usable program code for flushing the change log to persistent storage in the pervasive device to protect against power loss in the pervasive device.

16. The computer program product of claim 11, further comprising computer usable program code for specifying a slow sync in response to a reset condition detected in the pervasive device.

* * * * *